United States Patent
Chen et al.

(10) Patent No.: US 8,582,665 B2
(45) Date of Patent: Nov. 12, 2013

(54) IMAGE PROCESSING CIRCUIT AND ASSOCIATED METHOD

(75) Inventors: Chung-Yi Chen, Hsinchu Hsien (TW);
Su-Chun Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 487 days.

(21) Appl. No.: 12/480,126

(22) Filed: Jun. 8, 2009

(65) Prior Publication Data
US 2009/0316799 A1   Dec. 24, 2009

(30) Foreign Application Priority Data

Jun. 20, 2008   (TW) ................................ 97123113 A

(51) Int. Cl.
*H04N 11/02* (2006.01)
(52) U.S. Cl.
USPC ................. 375/240.27; 358/1.17; 375/240.16
(58) Field of Classification Search
None
See application file for complete search history.

(56) References Cited

U.S. PATENT DOCUMENTS

| | | | | |
|---|---|---|---|---|
| 4,092,677 A | * | 5/1978 | Saran | 382/245 |
| 4,703,348 A | * | 10/1987 | Yuasa et al. | 375/240.12 |
| 5,103,294 A | * | 4/1992 | Aoki et al. | 375/240.14 |
| 5,838,597 A | * | 11/1998 | Pau et al. | 708/203 |
| 6,192,080 B1 | * | 2/2001 | Sun et al. | 375/240.16 |
| 7,143,432 B1 | | 11/2006 | Brooks et al. | |
| 2003/0086498 A1 | * | 5/2003 | Lee et al. | 375/240.16 |
| 2005/0129121 A1 | | 6/2005 | Sung | |
| 2006/0023119 A1 | * | 2/2006 | Han | 348/452 |
| 2007/0110155 A1 | | 5/2007 | Sung et al. | |
| 2009/0027727 A1 | * | 1/2009 | Ovsiannikov | 358/1.17 |
| 2009/0257485 A1 | * | 10/2009 | Youn | 375/240.01 |

FOREIGN PATENT DOCUMENTS

EP         0013069 A1    9/1980

OTHER PUBLICATIONS

Taiwan Office Action 097123113, Dec. 13, 2011, 9 pages.

* cited by examiner

*Primary Examiner* — Christopher S Kelley
*Assistant Examiner* — Mohammed Jebari
(74) *Attorney, Agent, or Firm* — Edell, Shapiro & Finnan, LLC

(57) ABSTRACT

An image processing circuit includes a compression circuit, a plurality of first line buffers, a decompression circuit, and a motion estimation/compensation circuit. The compression circuit receives source image data and compresses the received source image data to generate a compressed image data. The first line buffers, coupled to the compression circuit, sequentially receive the compressed image data and buffer the compressed image data. The decompression circuit, coupled to the first line buffers, decompresses the compressed image data to generate a decompressed image data. The motion estimation/compression circuit, coupled to the decompression circuit, performs motion estimation/compensation according to the decompressed image data.

12 Claims, 5 Drawing Sheets

IMAGE PROCESSING CIRCUIT AND ASSOCIATED METHOD

CROSS REFERENCE TO RELATED PATENT APPLICATION

This patent application is based on Taiwan, R.O.C. patent application No. 097123113 filed on Jun. 20, 2008.

FIELD OF THE INVENTION

The present invention relates to an image processing mechanism, and more particularly, to an image processing circuit capable of reducing a total volume of line buffers and an associated method.

BACKGROUND OF THE INVENTION

In image processing, a dynamic random access memory (DRAM) is commonly used for storing source image data, which is then used for image processing when a subsequent motion estimation/compensation circuit accesses the DRAM. Note that a bandwidth of the DRAM is rather valuable. Supposing the motion estimation/compensation circuit frequently accesses the DRAM for the source image data, an overall performance is lowered due to latencies of the DRAM. Therefore, the prior art provides a plurality of line buffers between the DRAM and the motion estimation/compensation circuit, wherein the line buffers are generally realized using static random access memory (SRAM).

Reference is made to FIG. 1 showing a block diagram of a prior image processing circuit 100. As shown, line buffers 120a~120g sequentially receive and buffer image data bit streams outputted from a memory 105. For example, when the line buffer 120g receives and buffers every pixel data of the first scan line of the image data bit stream, the line buffer 102f receives and buffers every pixel data of the second scan line of the image data bit stream, and so forth. A motion estimation/compensation circuit 140 reads data of image blocks as needed from the line buffers 102a~102g, thereby avoiding performance degradation resulted from frequent accesses to the memory 105. However, when there are a large number of line buffers or when an overall storage volume needed by the line buffers is large, circuit cost as a whole is increased.

SUMMARY OF THE INVENTION

Therefore, to, among other things, overcome the foregoing issue of increased circuit cost, the present invention provides an image processing circuit capable of reducing a storage volume of line buffers and an associated method.

An image processing circuit, for receiving source image data and performing motion estimation/compensation, is provided according to one embodiment of the invention. The image processing circuit comprises a compression circuit, for receiving the source image data, and compressing the received source image data to generate a compressed image data comprising a plurality of line pixels; a plurality of first line buffers, coupled to the compression circuit, for buffering the line pixels; a decompression circuit, coupled to the first line buffers, for decompressing the line pixels to generate a decompressed image data; and a motion estimation/compensation circuit, coupled to the decompression circuit, for performing motion estimation/compensation according to the decompressed image data.

An image processing method, for receiving source image data and performing motion estimation/compensation, is further provided according to one embodiment of the invention. The image processing method comprises steps of: receiving the source image data, and compressing the received source image data to generate a compressed image data; sequentially receiving the compressed image data, and buffering the compressed image data at a plurality of first line buffers; decompressing the compressed image data to generate a decompressed image data; and performing motion estimation/compensation according to the decompressed image data.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
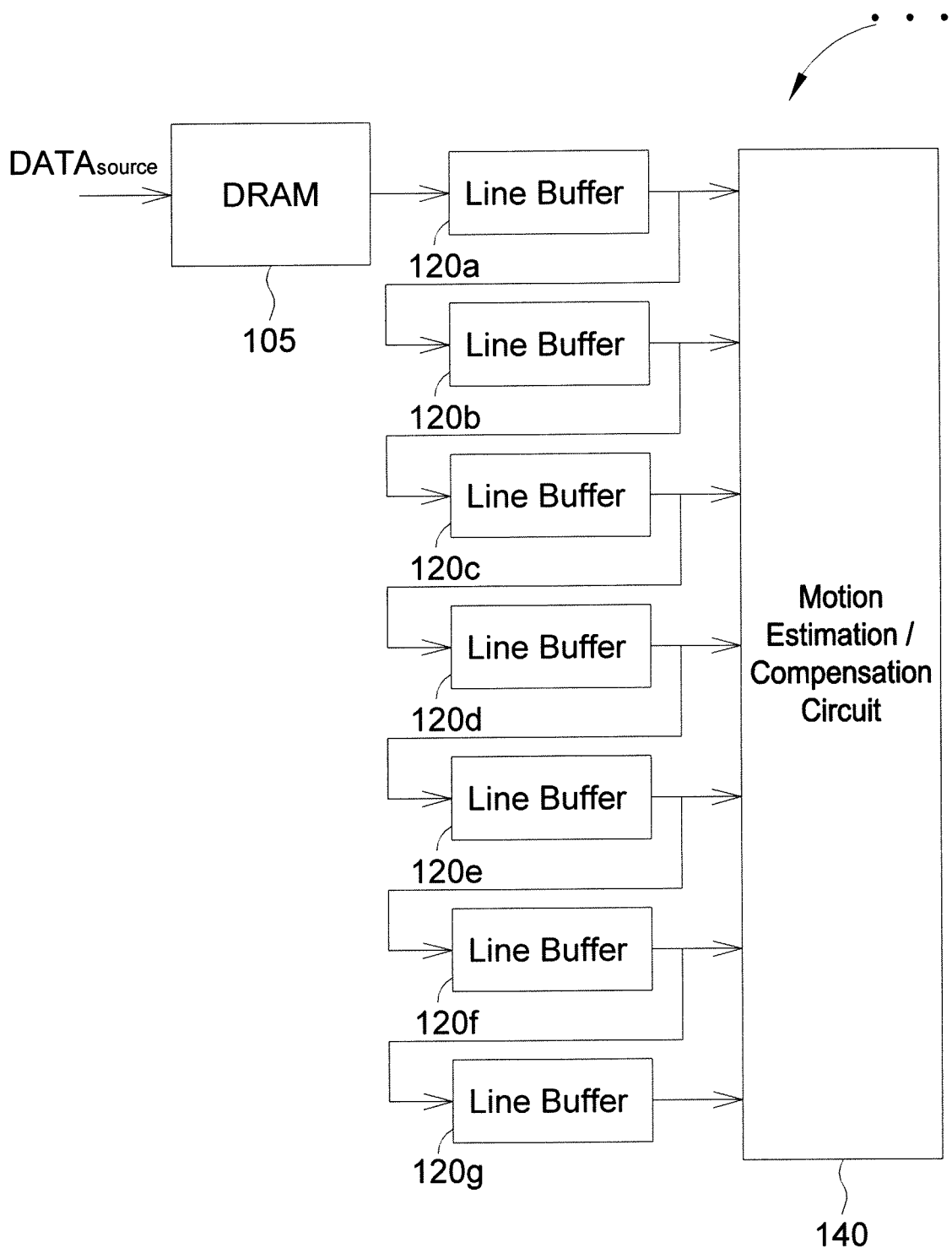
FIG. 1 is a block diagram of a prior image processing circuit.
Figure 2A:
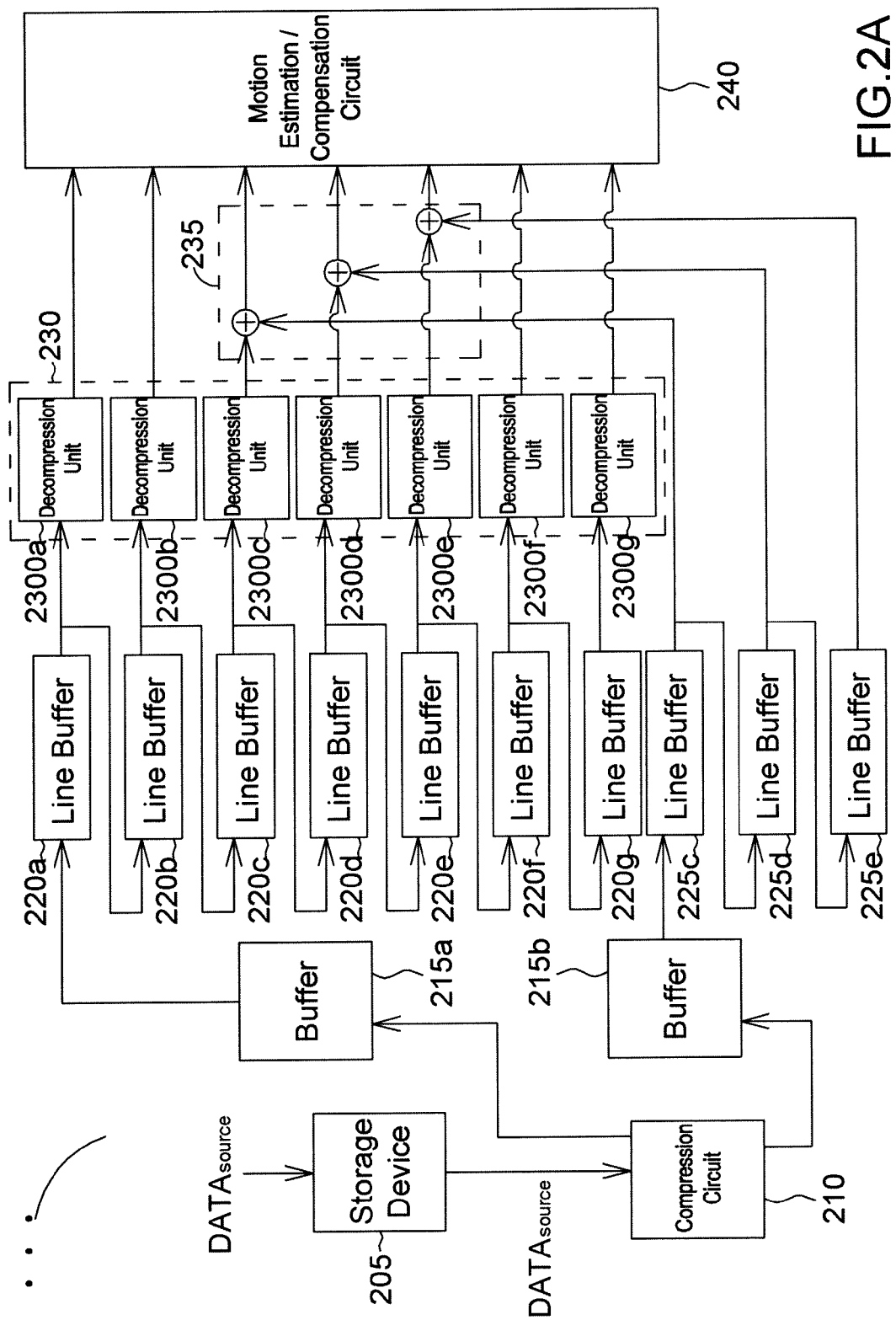
FIG. 2A is a block diagram of an image processing circuit according to one embodiment of the invention.
Figure 2B:
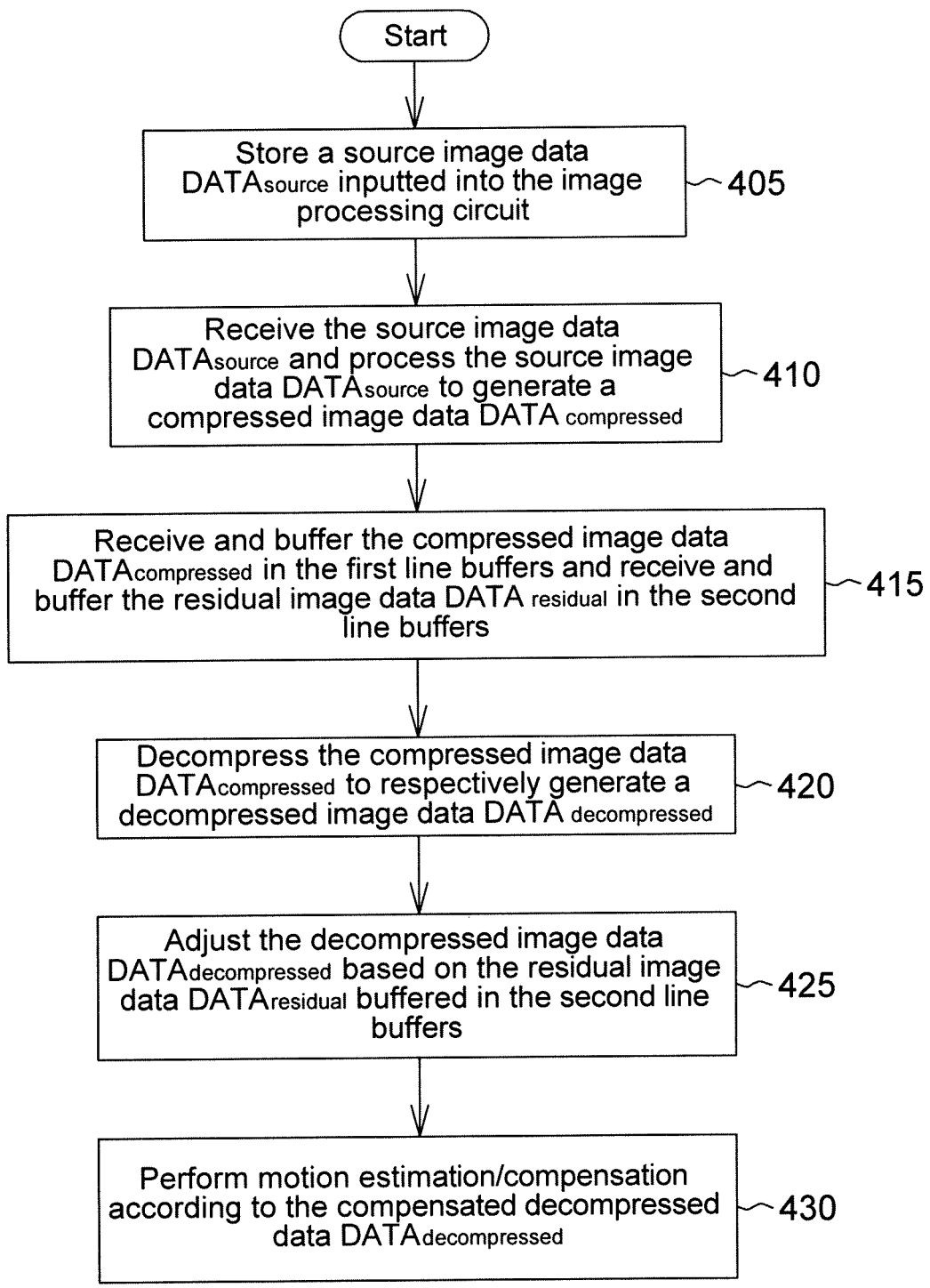
FIG. 2B is a flowchart depicting a method of operating the image processing circuit in FIG. 2A.

FIG. 2A shows a block diagram of an image processing circuit 200 according to one preferred embodiment of the invention, and FIG. 2B shows a flowchart of operating the image processing circuit 200 in FIG. 2A. The image processing circuit 200 comprises a storage device 205, a compression circuit 210, two buffers 215a and 215b, a first plurality of line buffers 220a~220g, a second plurality of line buffers 225c~225e, a decompression circuit 230, a processing circuit 235, and a motion estimation/compensation circuit 240. The storage device 205 may be a DRAM. The line buffers 220a~220g, and 225c~225e may be an SRAM. The image processing circuit 200 may be designed as a single chip, or the storage device 205 may be designed as a DRAM chip independent from the image processing circuit 200. As shown in FIG. 2B, in step 405, the storage device 205 stores source image data $DATA_{source}$ inputted into the image processing circuit 200. In step 410, the compression circuit 210 receives the source image data $DATA_{source}$ stored in the storage device 205 and processes the source image data $DATA_{source}$ to generate a compressed image data $DATA_{compressed}$ that is stored in the buffer 215a, and a residual image data $DATA_{residual}$ that is stored in the buffer 215b. Further, the compressed image data $DATA_{compressed}$ comprises a plurality of line pixels. In next step 415, the first line buffers 220a~220g sequentially receive and buffer line pixels of the compressed image data $DATA_{compressed}$, and the second line buffers 225c~225e receive and buffer the residual image data $DATA_{residual}$. In step 420, a plurality of decompression unit 2300a~2300g in the decompression circuit 230, corresponding to the first line buffers 220a~220g, decompress the compressed image data $DATA_{compressed}$ to respectively generate decompressed image data $DATA_{decompressed}$. In step 430, the decompressed image data $DATA_{decompressed}$ is forwarded to the motion estimation/compensation circuit 240 for subsequent motion estimation/compensation.

In this embodiment, the compression circuit 210 truncates a data width of each line pixel of the source image data $DATA_{source}$ to generate corresponding line pixels in the compressed image data $DATA_{compressed}$. The line pixels may be in the RGB format, the YUV format or other color formats. Taking the RGB format for example, the decompression circuit 210 truncates the data width of each R pixel data from 10-bit to 5-bit. More specifically, the data width of each R pixel data is truncated to remove the 5 least significant bits (LSBs) and leave the 5 most significant bits (MSBs), since the truncated 5 LSBs have a smaller impact on image quality. When restoring the compressed image data $DATA_{compressed}$, the decompression circuit 230 appends a predetermined bit pattern to a corresponding line pixel in the decompressed image data $DATA_{decompressed}$, such that each line pixel is restored to the original data width as before the compression to generate the decompressed image data $DATA_{decompressed}$. For example, for each line pixel data, the decompression circuit 230 appends a 5-bit pattern of "00000" as the LSBs to restore the data width of the line pixel to 10-bit for subsequent processing of the motion estimation/compensation circuit 240.

As described above, the compression circuit 210 according to this embodiment compresses data by truncating the data width, and decompresses data by appending a predetermined bit pattern. In other words, the decompressed image data $DATA_{decompressed}$ generated by the decompression circuit 230 is not entirely equal to the source image data $DATA_{source}$—it is possible that the human eye detects a certain degree of image distortion when the image is displayed on a monitor. Therefore, to elude the human eye from detecting image distortion when there is precision loss in the image data, the compression circuit 210 also generates the residual image data $DATA_{residual}$ comprising a plurality of residual line pixels. The residual image data $DATA_{residual}$ is first buffered in the residual buffer 215b, and are then buffered in the second line buffers 225c~225e according to a temporal sequence of the first line buffers. The first line buffer 220c and the second line buffer 225c correspond to a same horizontal scan line, the first line buffer 220d and the second line buffer 225d correspond to a same horizontal scan line, and so forth. The processing circuit 235 adjusts a part of the decompressed image data $DATA_{decompressed}$ based on the residual image data $DATA_{residual}$ buffered in the second line buffers 225c~225e, in step 425. Hence, in step 430, the motion estimation/compensation circuit 240 performs motion estimation/compensation according to the partly compensated decompressed data $DATA_{decompressed}$. In practice, when the compression circuit 210 truncates the data width of each line pixel to 5-bit to generate the compressed image data $DATA_{compressed}$, the 5 LSBs of each line pixel are taken as the residual image data $DATA_{residual}$. As a result, the adjusted part of the decompressed image data $DATA_{decompressed}$ is fully restored to the data as before the compression without any data precision loss.

Since the human eye detects image distortions of still objects more easily than detecting those of moving objects, the processing circuit 235 according to this embodiment adjusts a part of the decompressed data, such that the motion estimation/compensation circuit 240 is capable of interpolating a still image according to an image data that has no precision loss in the event that the image to be interpolated corresponds to a still image. For example, when the image processing circuit 200 interpolates a certain pixel on the fourth scan line of the image, the first to seventh scan lines serve as a search range for the motion estimation, and the compression circuit 210 sequentially truncates the data width of the RGB data of the line pixels of the first to seventh scan lines to 5-bit. Therefore, when the data width is 10-bit, the first line buffer 220a~220g respectively stores the 5 MSBs of each line pixel of the seventh to first scan lines. For example, the first line buffer 221 buffers the 5 MSBs of each line pixel of the seventh scan line, and so forth. Further, the compression circuit 210 sequentially outputs the 5 LSBs of each line pixel of the third to fifth scan lines to generate the residual image data $DATA_{residual}$, so that the second line buffers 225c~225e respectively stores the 5 LSBs of each line pixel of the fifth to third scan lines. For example, the second line buffer 225c buffers the 5 LSBs of each line pixel of the fifth scan line, and so forth. Hence, according to operations of the foregoing decompression circuit 230 and the processing circuit 235, the motion estimation/compensation circuit 240 receives the decompressed image data corresponding to each pixel of the first to seventh scan lines. The decompressed image data corresponding to the line pixels of the third to fifth scan lines is equal to the original image data of the line pixels of the third to fifth scan lines of the source image data $DATA_{source}$. More specifically, there is no precision loss in the data of the line pixels of the third to fifth scan lines, whereas small differences do exist between the decompressed image data corresponding to the remaining scan lines and the original image data of the line pixels corresponding to the remaining scan lines of the source image data $DATA_{source}$. That is, slight precision loss is present in the decompressed image data of line pixels of the remaining scan lines; however, image distortion resulting from such precision loss is unlikely to be detected by the human.

For example, when a motion estimation result of the motion estimation/compensation circuit 240 indicates that a vertical motion distance between the preceding and following images of an image object corresponding to a pixel to be interpolated exceeds a predetermined image range (e.g., when the vertical motion distance exceeds a range of the third to fifth scan lines), the motion estimation/compensation circuit 240 determines the image object as an image object with vertical motion, and generates the pixel to be interpolated according to the decompressed image data that is not adjusted by the residual image data $DATA_{residual}$. That is, the decompressed image data corresponding to the line pixels of the first, second, sixth or seventh scan line is used to generate the pixel to be interpolated. At this point, the image object is in fact a moving image object, and it is unlikely that the image object with slight distortion generated by the motion estimation/compensation circuit 240 using the decompressed image data with slight precision loss is detected by the human eye. Further, when the vertical motion distance is smaller than the range of the third to fifth scan lines, the motion estimation/compensation circuit 240 treats that image object as an image object without vertical motion, and generates the pixel to be interpolated using the decompressed image data that is adjusted by the residual image data $DATA_{residual}$. That is, the decompressed image data corresponding to the line pixels of the third to fifth scan lines is used to generate the pixel to be interpolated. At this point, the image object corresponding to the pixel to be interpolated is a still image object or an image object with horizontal motion, and thus the issue of image distortion is eliminated since the motion estimation/compensation circuit 240 uses the decompressed image data (free of precision loss) corresponding to the line pixels of the third to fifth scan lines to generate the image of the macro block MB to be interpolated.

The compression circuit 210 may also selectively output the residual image data $DATA_{residual}$ to the second line buffers 225c~225e according to a motion estimation result of the motion estimation/compensation circuit 240. Note that the purpose of the residual image data $DATA_{residual}$ is to adjust a part of the decompressed image data $DATA_{decompressed}$ to interpolate, according to the adjusted decompressed image data $DATA_{decompressed}$, a still image object with slight distortion that is unobvious to the human eye. Therefore, as encompassed by the scope of the invention, when the motion estimation result indicates a pixel to be interpolated corresponds to an image object with vertical motion, the compression circuit 210 may opt not to output the residual image data $DATA_{residual}$ to the line buffers 225c~225e; when the motion estimation result indicates that the pixel to be interpolated corresponds to an image object without vertical motion, the compression circuit then outputs the residual image data $DATA_{residual}$ to the line buffers 225c~225e.

Figure 3A:
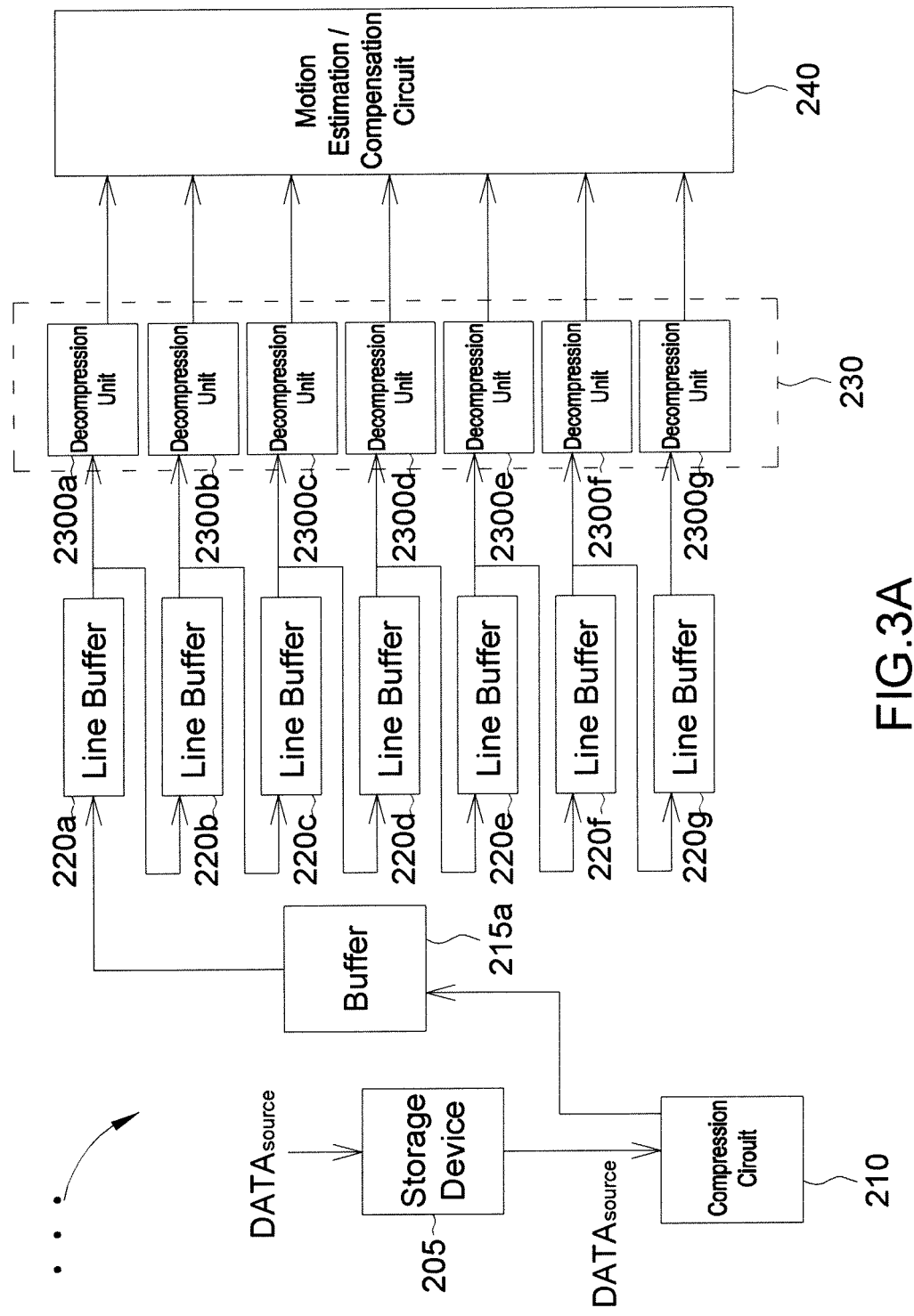
FIG. 3A is a block diagram of an image processing circuit according to another embodiment of the invention.
Figure 3B:
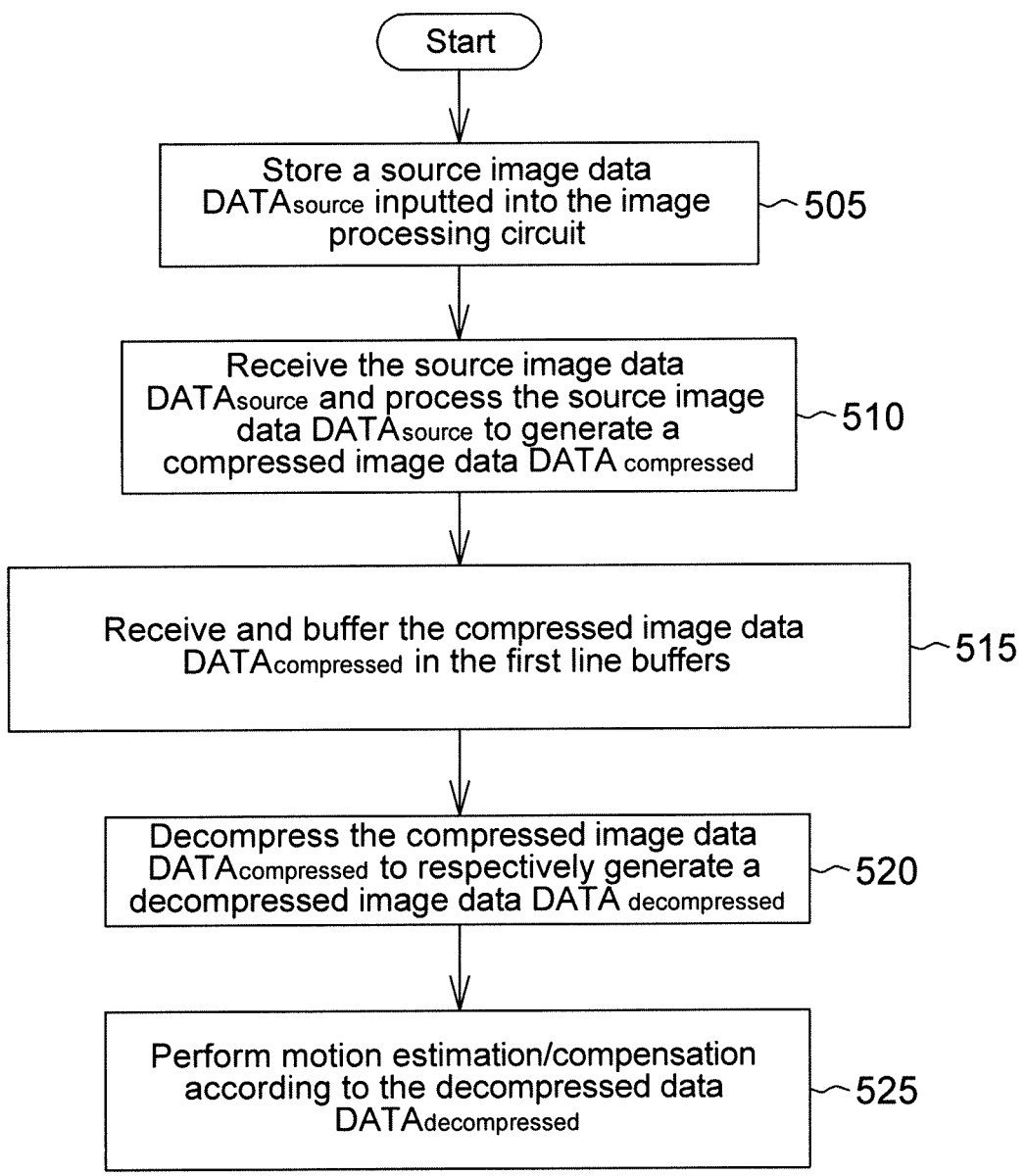
FIG. 3B is a flowchart depicting a method of operating the image processing circuit in FIG. 3A.

To further reduce storage volume of the line buffers implemented, i.e., to reduce storage volume of the SRAM, the decompressed image data is adjusted selectively. In other words, by compromising certain image quality, the storage volume occupied by the SRAM is reduced as much as possible. FIG. 3A shows an image processing circuit 300 according to another embodiment of the invention. A difference between the two image processing circuits is that, the image processing circuit 300 in FIG. 3A does not comprise the residual buffer 215b, the second line buffers 225c~225e, and the processing circuit 235 as comprised in the image processing circuit 200 in FIG. 2A. Since the data width of each line pixel is truncated by the compression circuit 210, and the decompression circuit 230 is incapable of fully restoring the compressed image data $DATA_{compressed}$ to the original source image data $DATA_{source}$, the slight data difference between the decompressed image data $DATA_{decompressed}$ and the source image data $DATA_{source}$ inevitably leaves partial image distortion. However, by compromising certain image quality due to the image distortion, the storage volume of the SRAM implemented is reduced as much as possible—such image distortion can thus be neglected. FIG. 3B shows a flowchart of operating the image processing circuit 300. In FIG. 3B, apart from steps 515 and 525 that are slightly different from the corresponding steps in FIG. 2B, steps 505, 510 and 520 are similar to the corresponding steps 405, 410 and 420, and shall not be again discussed for brevity.

In conclusion, the image processing circuit 200/300 according to the invention reduces storage volume of the line buffers by ways of data compression. In addition, to ensure that image distortion resulting from precision loss is not detected by the human eye, the image processing circuit 200 restores a part of the decompressed image data that needs a higher image quality (e.g., a still image) to the original source image data, so as to attend to both purposes of reducing line buffer cost and maintaining image quality. It is to be noted that, the embodiments above are for illustrating operations of the invention but not to limit the invention thereto. For example, the number of the first line buffers may be other than 7, and is generally associated with the search range for motion estimation. The compression circuit 210 is not limited to truncate the data width to 5-bit, nor limited to compressing the data only by truncating the data width; and the decompression circuit 230 implements a corresponding decompression mechanism. Further, the decompressed image data with slight precision loss is nevertheless suitable for motion estimation, which is designed to find a motion vector but not to perform image interpolation using image data with the precision loss.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing circuit, for receiving source image data and performing motion estimation/compensation to generate an interpolated image between two successive images, comprising:
   a compression circuit, for receiving source image data, and compressing the received source image data to generate a compressed image data comprising a plurality of line pixels and to generate residual image data comprising a plurality of residual line pixels, wherein the residual image data comprises a selected number of least significant bits of a word representing a given line pixel;
   a plurality of first line buffers, coupled to the compression circuit, for buffering the line pixels;
   a decompression circuit, coupled to the first line buffers, for decompressing the line pixels to generate a decompressed image data;
   a motion estimation/compensation circuit, coupled to the decompression circuit, for performing motion estimation/compensation to calculate motion vectors and then generate an interpolated image between the preceding and following images for frame rate up-conversion according to the decompressed image data;
   a plurality of second line buffers, coupled to the decompression circuit, for sequentially receiving and buffering the residual image data; and
   a processing circuit, coupled to the decompression circuit and the second line buffers, for adjusting the decompressed image data according to the residual image data.

2. The image processing circuit as claimed in claim 1, wherein the compression circuit truncates a data width representing each line pixel of the source image data to generate a corresponding line pixel in the compressed image data, and the decompression circuit appends a predetermined bit pattern to the corresponding line pixel of the compressed data to restore the data width to generate the decompressed image data.

3. The image processing circuit as claimed in claim 1, wherein the number of the second line buffers is less than that of the first line buffers.

4. The image processing circuit as claimed in claim 1, wherein the compression circuit selectively outputs the residual line pixels according to a motion estimation result of the motion estimation/compensation circuit; when the motion estimation result indicates a pixel to be interpolated corresponds to an image object with vertical motion, the compression circuit does not output the residual line pixels to the second line buffers; and when the motion estimation result indicates a pixel to be interpolated corresponds to an image object without vertical motion, the compression circuit outputs the residual image data to the second line buffers.

5. The image processing circuit as claimed in claim 1, wherein the compression circuit truncates a data width representing each pixel of the source image data to generate the compressed image data, and the decompression circuit appends a predetermined bit pattern to the corresponding line pixel of the compressed data to restore the data width to generate the decompressed image data.

6. The image processing circuit as claimed in claim 5, wherein the compression circuit generates the residual image data according to the truncated data of the source image data, which corresponds to the selected number of least significant bits of a word representing a given line pixel.

7. An image processing method, for receiving source image data and performing motion estimation/compensation to generate an interpolated image between two successive images, comprising steps of:

receiving source image data, and compressing the source image data to generate a compressed image data comprising a plurality of line pixels;

generating residual image data comprising a plurality of residual line pixels, wherein the residual image data comprises a selected number of least significant bits of a word representing a given line pixel;

sequentially receiving the line pixels buffered in a first plurality of line buffers;

receiving and buffering the residual line pixels at a second plurality of line buffers;

decompressing the line pixels to generate a decompressed image data;

adjusting the decompressed image data according to the residual line pixels; and performing motion estimation/compensation to calculate motion vectors and then generate an interpolated image between the preceding and following images for frame rate up-conversion according to the decompressed image data.

8. The image processing method as claimed in claim 7, wherein the step of receiving the source image data, and compressing the source image data to generate the compressed image data comprising the line pixels comprises steps of:

truncating a data width of each pixel of the source image data to generate the compressed image data; and decompressing the line pixels to generate the decompressed image data comprises a step of appending a predetermined bit pattern to each of the line pixels to restore the data width to generate the decompressed image data.

9. The image processing method as claimed in claim 7, wherein the number of the second line buffers is less than that of the first line buffers.

10. The image processing method as claimed in claim 7, wherein the step of adjusting the decompressed image data according to the residual line pixels further comprises a step of:

not outputting the residual image data to the second line buffers when a motion estimation result indicates a pixel to be interpolated corresponds to an image object with vertical motion; else, outputting the residual image data to the second line buffers.

11. The image processing apparatus as claimed in claim 1, wherein the residual image data comprises 5 least significant bits of a word representing a given line pixel.

12. The image processing method as claimed in claim 7, wherein the residual image data comprises 5 least significant bits of a word representing a given line pixel.

* * * * *